Aug. 27, 1974　　　　　　L. R. KINSEY　　　　　　3,832,237
EXCHANGEABLE ELEMENTS FOR A STORAGE BATTERY
Original Filed Feb. 18, 1971　　　　　　　　　　　3 Sheets-Sheet 1

Aug. 27, 1974          L. R. KINSEY          3,832,237
EXCHANGEABLE ELEMENTS FOR A STORAGE BATTERY
Original Filed Feb. 18, 1971          3 Sheets-Sheet 2

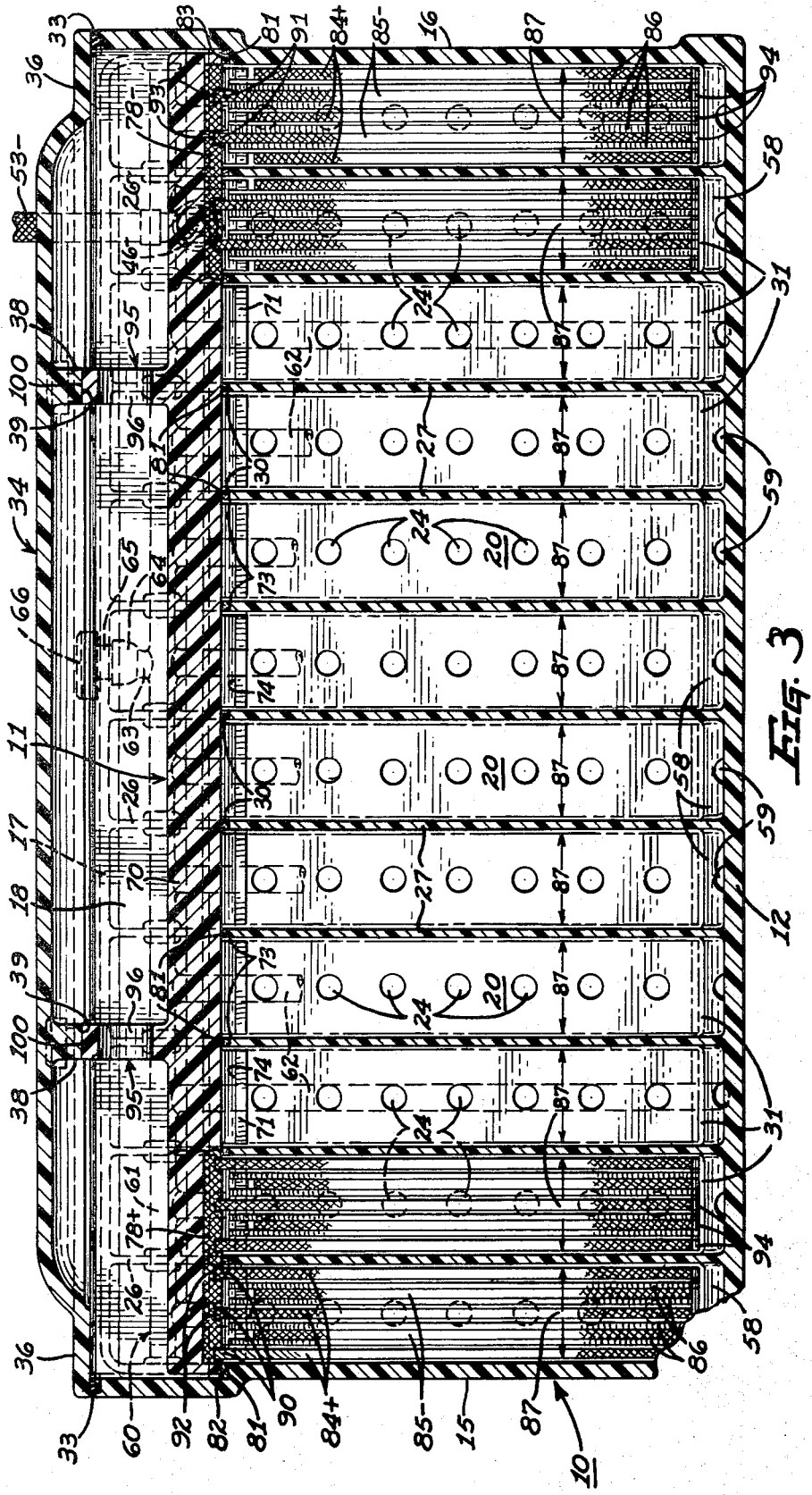

ns to make or break. The lead plates are partly suspended by the contacts, when the lead plates are lifted out the connection is automatically broken and when a new set of lead plates is returned to the battery case and mounted correctly the contact is automatically made.
United States Patent Office 3,832,237
Patented Aug. 27, 1974

3,832,237
EXCHANGEABLE ELEMENTS FOR A
STORAGE BATTERY
Lewis R. Kinsey, 108 S. 25th St., Phoenix, Ariz., 85034
Original application Feb. 18, 1971, Ser. No. 116,400.
Divided and this application Oct. 24, 1972, Ser. No. 299,913
Int. Cl. H01m 13/10
U.S. Cl. 136—134
4 Claims

ABSTRACT OF THE DISCLOSURE

A rebuildable, rechargeable wet cell storage type battery employing a novel replaceable modular plate structure.

BACKGROUND OF THE INVENTION

This application is a division of U.S. patent application, Ser. No. 116,400 filed Feb. 18, 1971 by Lewis R. Kinsey, entitled Storage Battery With Exchangeable Elements, now U.S. Pat. 3,781,175 and relates to improvements in wet cell storage batteries and more particularly to improvements in the encasement structure for lead acid type batteries which can be used to provide a six, twelve, twenty-four or higher volt source of power for direct propulsion of electric automobiles or the like.

Field of the Invention

This invention is directed to wet cell batteries for use in driving automobile engines particularly of the electric type which batteries can be easily and quickly recharged by replacement of its plates and battery acid.

DESCRIPTION OF THE PRIOR ART

It is well known that one of the limiting factors in the introduction and use of electric cars is the short battery energy life of the present battery structures. Further, in order to power an electric automobile the total number of present day batteries needed is prohibitive filling the entire trunk space of the vehicle. Even though recharging of the batteries can be undertaken periodically such as overnight while the vehicle is not in use, this period of servicing is also not satisfactory since the range of travel of the vehicle is unduly limited. Thus, a need exists for storage batteries with exchangeable elements which may be quickly serviced by a service station so as to increase the range of travel of the vehicle.

For normal use, it is much faster to exchange a discharged battery than to recharge it, but when more and more power is needed from a battery, it soon becomes too big, heavy and cumbersome for a simple exchange. Thus, a need exists for a new and improved battery wherein the battery elements can be exchanged for recharged elements.

SUMMARY OF THE INVENTION

In accordance with the invention claimed, an improved storage battery with exchangeable elements is provided which may be quickly torn down, replaced and recharged with a minimum of effort by a service station attendant.

The new and improved battery has been arranged so that it can be simply opened and the lead plates lifted out in one piece as a single unit. The discharged electrolyte is then pumped from all cells at the same time through a built-in manifold system. The same amount of newly recharged electrolyte is returned to each cell through the same manifold. A newly recharged and clean matching set of lead plates are returned to the battery. The contact part of the bus bars are located only on one end, so when mounting if the lead plates are inserted in the battery case backwards there will be no electrical connection. This will prevent any cross polarity.

In servicing this battery there are no electrical connections to make or break. The lead plates are partly suspended by the contacts, when the lead plates are lifted out the connection is automatically broken and when a new set of lead plates is returned to the battery case and mounted correctly the contact is automatically made.

The top cover of the battery case when closed serves two functions, namely to prevent the spilling and loss of fluid, and to hold down the lead plates to solidly mount them in the battery case.

It is, therefore, one object of this invention to provide a new and improved battery.

Another object of this invention is to provide an improved battery which can be quickly assembled or dismounted and arranged such that the interior parts of the battery can be removed as a unit from the casing.

A further object of this invention is to provide a new and improved battery in which the internal parts and acid are replaced rather than recharged by the known procedures.

A still further object of this invention is to provide a new and improved battery in which the acid storing capacity is greatly increased.

A still further object of this invention is to provide a new battery structure in which the voltage rating of the battery is increased without increasing its weight in the proportions heretofore necessary.

A still further object of this invention is to provide a new method of recharging a battery.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings in which:

FIG. 3 is a longitudinal cross sectional view taken substantially on the line 3—3 of FIG. 1.

DESCRIPTION OF PREFERRED EMBODIMENT

Figure 1:
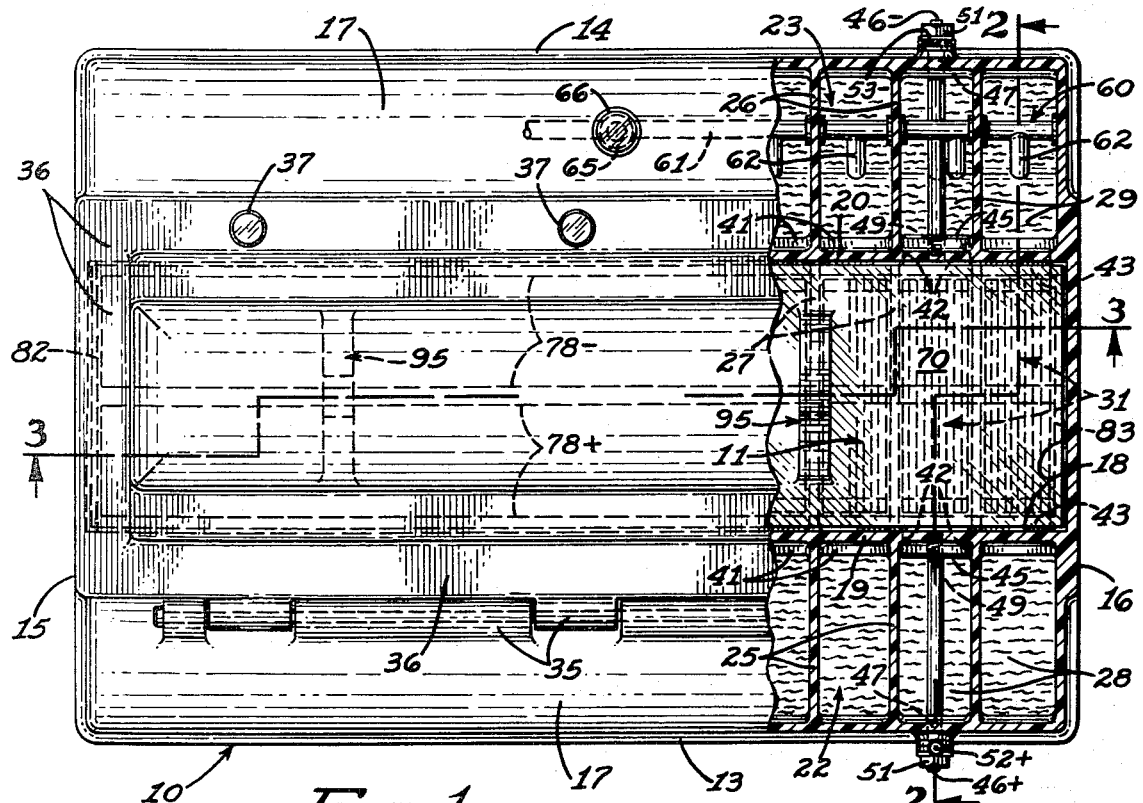
FIG. 1 is a top plan view, partly broken away and partly in section, of a battery of the wet cell storage type, embodying the invention.

Referring more particularly to the drawings by characters of reference, FIGS. 1, 2, 3 and 5 disclose a wet cell storage battery similar to the type generally used for lighting, starting and propulsion of various vehicles. The battery of this invention is substantially larger in overall dimensions than most batteries of this type, the purpose of which will be evident as the description proceeds and comprises a battery case or container generally represented by the reference character 10 and a removable grid or plate holder assembly generally represented by the reference character 11.

The battery case 10 is made from a nonconductive material such as hard rubber or plastic composition and in the preferred form shown is a rectangular shaped box-like structure having a bottom or base 12, vertical side walls 13 and 14, and walls 15 and 16 and a cover portion 17. About one-third of each top side of the cover portion 17 is formed as an integral part thereof and the central portion is formed to provide a rectangular opening 18 of any desired width, which extends longitudinally to the inside of end walls 15 and 16. Opening 18 together with longitudinally disposed vertical supporting partitions 19 and 20 are formed to define a central cavity or container 21 which extends upwardly from the bottom 12 through top cover portion 17 of battery case 10. The cavity 21 is adapted to receive the grid-holder assembly 11 and provide for its quick removal as will later be described.

Supporting partitions 19 and 20 together with the case side walls 13 and 14 define two longitudinal chambers 22 and 23 which extend upwardly from the bottom 12 to the top cover portions 17 on each side of the central cavity 21 of the case 10. Chambers 22 and 23 are completely closed on three sides but are open to communication with the central cavity 21 through a plurality of distribution holes 24, in supporting partitions 19 and 20.

Chambers 22 and 23 and the mid-section cavity or container 21 are divided longitudinally by a plurality of aligned transverse partition walls 25, 26 and 27, respectively. Partition walls 25 and 26 extend upwardly from the bottom 12 of the case to the top cover 17 and thereby divide chambers 22 and 23 into a plurality of separate substantially closed compartments 28 and 29. Partition walls 27 extend upwardly from the bottom 12 of the case in the central cavity 21 a predetermined distance to heir tops 30, thereby dividing the central cavity 21 into a plurality of open top containers or cells 31, which are adapted to receive and contain the grid and separator assemblies of the battery as will be further described.

The top cover portion 17 of the case 10 has a reinforced flat surfaced portion 32 which extends around the perimeter of the opening 18 in the top surface of which is installed a compressible gasket 33. A sturdy reinforced cover member 34 is pivoted by means of a hinge 35 at one side of the opening 18 to the top cover portion 17, and is provided with flat under surface extensions 36 around the perimeter which are adapted to contact the gasket 33 and seal the opening 18 from escape of liquids when the gaskets are compressed by means of suitable thumb screws 37 which are threaded into one side of the reinforced portion 32 of the cover. Pivoted cover member 34 has on its central underside, projecting downwardly therefrom and integral therewith, two or more projections 38, each having arcuate formed under surfaces 39, the purpose of which will hereinafter appear.

It should be noted that the upper portions of longitudinal supporting partitions 19 and 20 are provided with a pair of flat longitudinal supporting ledges 40 which together with a pair of integral longitudinally extending bosses 41 project into chambers 22 and 23. Two rectangular cutout portions 42 (see FIGS. 1 and 2) as wide as the chamber compartments 28 and 29 are located adjacent each end of the bosses 41 to provide support for a pair of connector bars 43 which may be made of a lead alloy or any suitable conductive material and which extend to full length and on each side of cavity 21. Connector bars 43 have V-shaped lognitudinal grooves in their top exposed surfaces and at least two tabs or extensions 45 which are adapted to fit snugly into the rectangular cutout portions 42 in the bosses 41, and to be securely sealed therein.

A pair of terminal connector posts 46 of suitable non-corrosive material, one positive and one negative, are inserted through aligned bores 47 in bosses 48 located at either end and near the top of case side walls 13 and 14, which are secured in the connector bar extensions 45 by means of threads 49 or any other suitable manner. The ends of terminal posts 46 project outwardly of the bosses 48 and are provided with sealing washers 50 and nuts 51 for securely connecting a positive power cable 52 and a negative ground cable 53 thereto.

The inside top surface 54 of the bottom 12 of the case is gradually sloped downwardly from side walls 13 and 14 to a point 55 approximately midway in chamber 23 to form a trough 56 where all liquids contained in the case 10 must settle by flowing through apertures 57 at the bottom of longitudinal partitions 19 and 20, which communicate with all compartments in the case. A pair of spaced longfiitudinal ridges 58 at the bottom of central cavity 21, also have apertures 59 to provide for uninterrupted flow of liquid toward the point 55 at the bottom of compartment 23 in the case for each cell.

For the purpose of filling, removing or adding suitable liquids to the various compartments of the battery case 10, there has been provided a built in hollow manifold structure 60 which may be fabricated of the same material as the case, and which comprises a longitudinal tubular portion 61 which extends lengthwise through and is attached to or is integral with all of the transverse portion walls 26 in chamber 23 and has downwardly disposed hollow members 62 one for each cell which extend to the bottom of each of the compartments 23. An upwardly disposed tubular extension 63, located midway in the manifold portion 61 has a hollow conical top portion 64 which communicates with an opening 65 in the top cover portion 17 of the case and which is adapted to receive a removable vent cap 66 or a fitting 67 which may be attached to the end of a suitable filling or suction hose 68 shown in phantom line in FIG. 2.

Referring now to the several figures of the drawings which disclose the preferred embodiment of the removable grid holder assembly 11, previously mentioned in this description, reference character 70 represents the top plate or supporting member of this assembly, this supporting member may be made of plastic or any other non-conductive material rectangular in shape and extending horizontally with slight clearance to the inside of end walls 15 and 16 which define the opening 18 in the case 10. Top plate 70 has integral depending support extensions 71 on each side which are positioned to allow slight clearances from the inside surfaces 72 of the supporting partitions 19 and 20. Support extensions 71 are longitudinally bifurcated or slotted vertically as indicated at 73 to provide necessary clearance for the cell divider partitions 27 in the container 21, which they are adapted to straddle, as shown in FIG. 3. Support extensions 71 are slotted on their inside surfaces to form ledges 74 on suitable tabs 75, which extend from the edges of all grids or separators are supported.

The underside 76 of support plate 70 has dove tail shaped longitudinal cutouts or grooves 77 which extend to the ends, and are positioned on both sides of the center of the plate. These cutouts or grooves 77 are used for the purpose of supporting lead bus bars 78 of dissimilar polarity in the plate. Bus bars 78 are provided with integral, longitudinal connector bars 79 imbedded in plate 70 and having extensions 80 protruding from each side of the plate. The extensions are provided to fit snugly into the V-shaped grooves 44 provided in the tops of connector bar 43.

The underside 76 of plate 70 also has a compressible gasket 81 attached thereto in any suitable manner such as by cementing, which contacts the tops 30 of partition walls 27 and ledges 82 and 83 formed in end walls 15 and 16 of the case to prevent leakage or overflow of liquid from the cells 31.

A predetermined number of grids or positive plates 84, negative plates 85 together with plate separators 86 therebetween, are assembled into compact groups 87 (see FIG. 3). The total sum of their assembled thickness being slightly less than the distance between cell partitions 27, and the width of all plates and separators in each assembly or group 87, is slightly less than the distance between the inside surfaces 72 of partitions 19 and 20. Partitions 19 and 20 form the lateral side walls of the cells 31, thereby allowing sufficient clearance on all sides of each cell to provide for easy removal or insertion of all of the groups 87 from or into their respective cells at one time.

The positive and negative plates and plate separators utilized in the preferred embodiment of this invention are similar in most respects to those used in conventional automotive type batteries, but differ therefrom in the following respects. The contacting or facing surface area of each plate and separator is much greater than the conventional types, all being wider and longer in overall dimensions, thereby able to produce peak power in the form of electric current for a longer period of time. The positive plates 84 and the negative plates 85 are each provided with integral upwardly projecting tabs or contact members 90 and 91 which are almost as wide as the positive and negative bus bars 78. These members are adapted to fit snugly in transversely aligned slots 92 and 93 in the underside of their respective bus bars to support each plate in suspension above the surface 54 of the floor or base 12 of their respective cells 31. Longitudinal ridges 58 which are directly below downwardly projecting tabs 94 common to all plates and separators (see FIG. 2) are intended to prevent any plate or separator which might become fractured, from slipping to the bottom of the cell where it could cause blockage of apertures 57 and 59 and interfere with distribution of the electrolyte.

Figure 4:
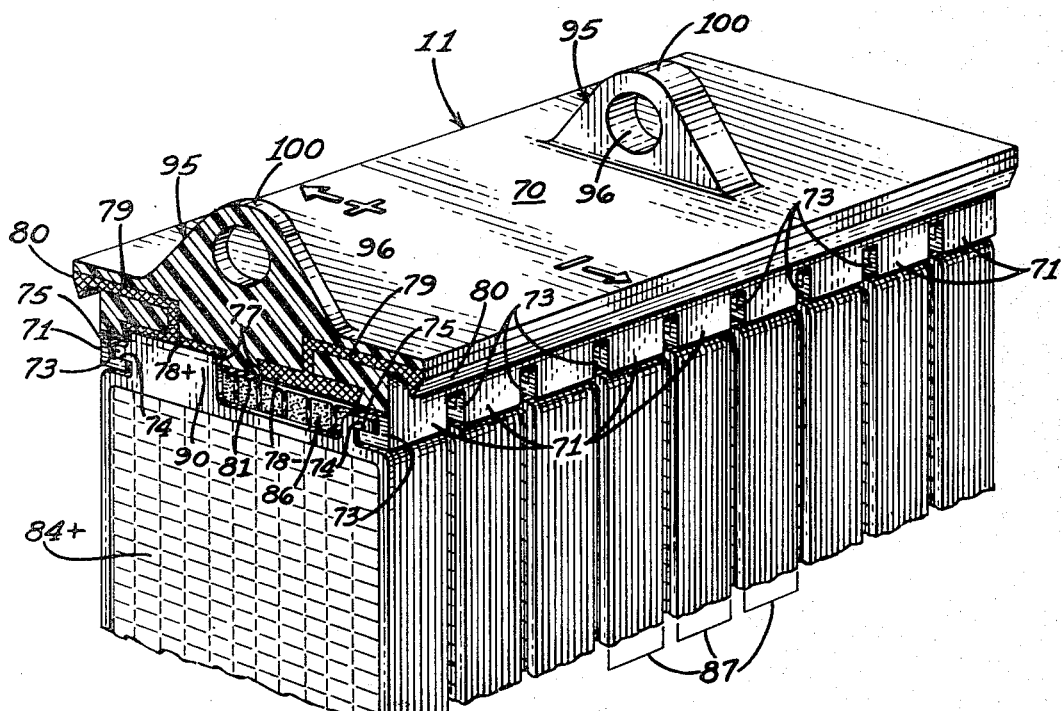
FIG. 4 is a fragmentary perspective view, partly in section of the exchangeable plate assembly element removed from its case.
Figure 2:
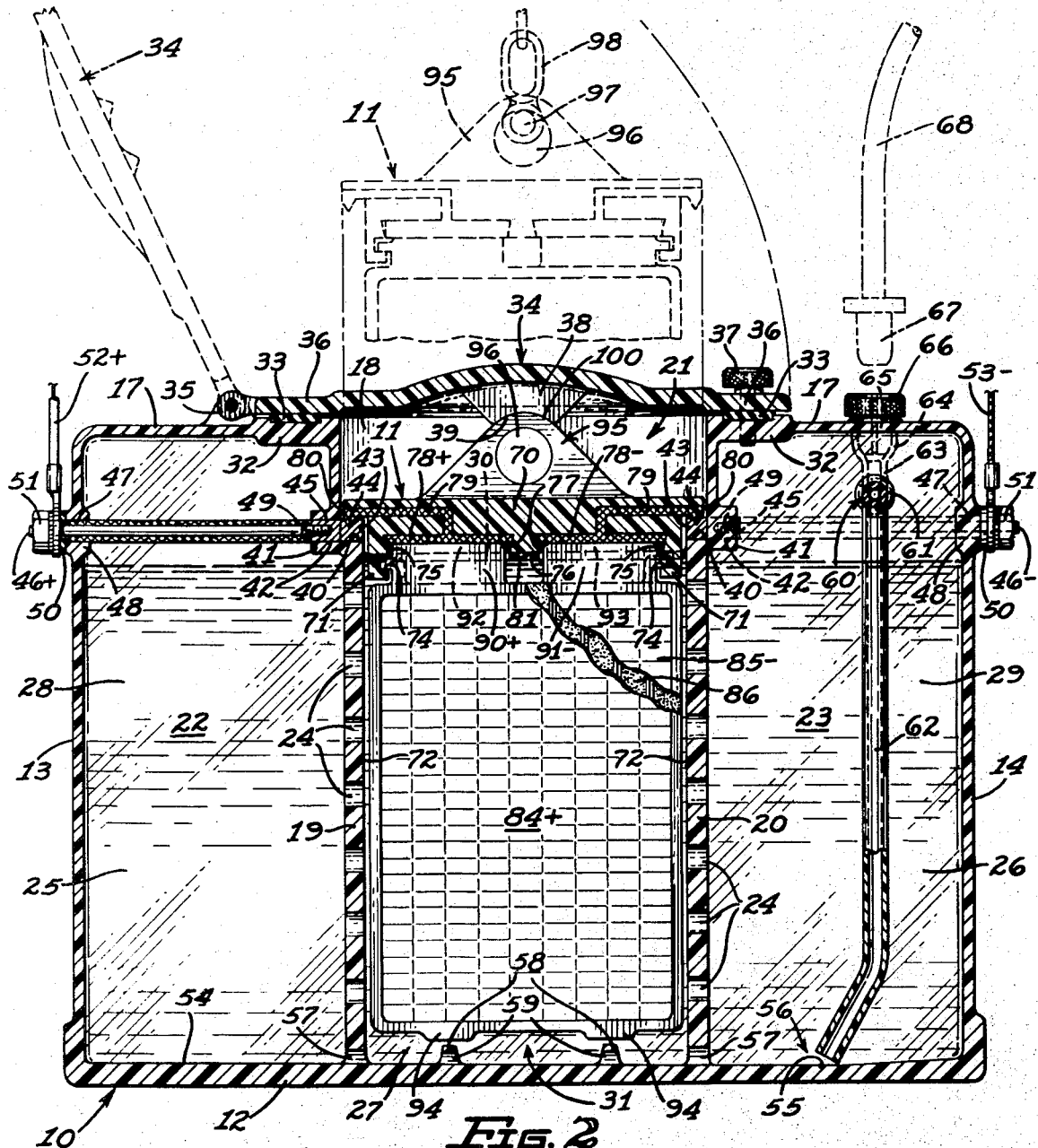
FIG. 2 is a cross sectional view of the battery taken substantially along the line 2—2 of FIG. 1 with some elements broken away and others in dotted or phantom line to illustrate the features of the invention.
Figure 5:
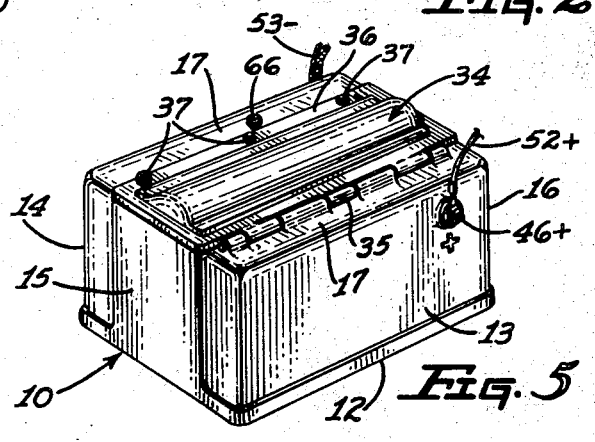
FIG. 5 is a perspective view of the battery of the invention ready for use.

In order to facilitate removal and replacement of the heavy grid holder assembly 11, from or to its installed position in the cavity or container 21 of the case, the top plate supporting member 70 has been provided with two or more upwardly projecting lifting handles 95 which are shown in FIGS. 2, 3 and 4 to be integral with top plate 70, and longitudinally aligned with the depending projections 38 on the underside of the cover member 34. The lifting handles are provided with aligned apertures 96 into which a lifting bar 97 may be inserted. The lifting bar may then be attached to chains 98 forming a part of a block and tackle or other lifting apparatus not shown.

Lifting handles 95 are provided with flat arcuate top portions 100 which are adapted to match and contact the arcuate underside areas 39 of the cover projections 38 to apply downward pressure on the grid holder assembly 11 when the cover member 34 is in secured closed position. This action prevents any possibility of electrical contact breakage which could be caused by vertical stresses imposed on the holder assembly 11 when the battery carrying vehicle moves over rough spots on the highway.

The advantages, usage and servicing requirements for such a battery as compared to a conventional automotive type battery are as follows:

The battery as shown and described has 12 electric power producing cells and generally produces approximately 2 volts per cell or 24 volts when fully charged.

The lead plates and separators contained in each cell of the battery are much larger than conventional plates, and therefore provide greater surface areas to fully absorb the acid from the electrolyte to produce more electrical energy for a greater period of time than heretofore possible.

The acid water solution or electrolyte capacity of the battery case is many times greater than the capacity of a conventional battery, and the provisions for thoroughly distributing the electrolyte into and out of the current generating cells of the battery allows for greater absorbtion of acid by the plates and less dilution of the electrolyte over a longer period of time.

USAGE

This battery is intended primarily for use as a motive power unit for propulsion, lighting and other electrical requirements for cars or other highway type vehicles but of course could be used to power many other types of commercial vehicles such as lift trucks, tractors and the like.

The battery is much larger and heavier than a conventional automotive battery, but would occupy less space and be lighter than an internal combustion engine and battery which it and a suitable electric motor would replace and of course would not produce gas fumes or any other contaminating ingredients to pollute the air.

SERVICING REQUIREMENTS

All batteries of the wet cell storage type require occasional servicing such as the addition of water to the cells, recharging and sometimes major repairs or rebuilding. When recharging is required of a conventional battery it is usually accomplished with suitable charging equipment available in most service stations with the battery remaining in the vehicle. Because a slow charge procedure requiring several hours to complete is more satisfactory than the so called quick charge procedure which does not fully charge the battery, it is usually not utilized since it ties up the vehicle for long periods of time.

The battery of this invention has been designed to eliminate long delays of immobility of the vehicle which it powers and to furnish enough electrical motive power to propel the vehicle for considerable distances on a highway before reaching a discharged condition and then to be renewed or recharged at a properly equipped service station in a very short time (as little as 15 to 20 minutes) to provide the vehicle with the necessary motive power to continue on its briefly interrupted trip.

Recharging or renewing of this battery in a minimum length of time would be accomplished in the following manner.

The vehicle requiring battery service would be driven into a properly equipped battery recharge or booster station located at intervals along the highway and without removing the heavy battery from the vehicle, an attendant would remove the single filler vent cap from the top of the case and attach a suction hose to the opening. By use of the special manifold built into the case, he quickly removes all of the discharged, diluted electrolyte from the case. He then gains access to the central opening in the top of the case by removing the cover hold down thumb screws and pivots the cover back out of the way, thereby relieving the pressure on the lifting handles of the grid holder assembly and making the same ready for quick removal from the case.

The attendant then inserts a lifting bar attached to a suitable lifting and conveying apparatus, into the openings in the lifting handles to remove the grid or plate holder assembly directly upward and out of the case and to a suitable fixture where it may be later serviced. A clean, freshly charged or renewed plate and holder assembly which is identical with the one previously removed is then picked up by the same lifting apparatus and conveyed to a position directly over the opening in the battery case and carefully lowered to its respective position therein. The cover member is then closed and secured by the hold down thumb screws to complete the installation and automatically making the necessary electrical connections. The battery is then ready for the reception of freshly charged electrolyte which is simply pumped into the distributing manifold until it reaches its proper level in the case.

The above servicing procedure (requiring only 15 to 20 minutes to complete) results in a fully charged battery capable of powering the vehicle for many more miles.

It should be understood that the battery of this invention could be recharged in the conventional manner with suitable charging equipment in a service station or at home by a simple connection to an automatic over-night charger.

Although but one embodiment of the present invention has been illustrated and described, it will be apparent to those skilled in the art that various changes and modifications may be made therein without departing from the spirit of the invention or from the scope of the appended claims.

What is claimed is:
1. A modular battery plate assembly comprising: a plurality of plates, each plate having a post member arranged to extend upwardly therefrom within an upper portion of said plate assembly, said plates being spacedly arranged in groups, each group receiving therebetween an insulating means for separating each of said groups one from the other, a pair of but bars each extending longitudinally of the plate assembly for connecting together post members of the plates of the groups in positive and negative voltage orientation, cover means arranged to extend over the top of said groups, post members and said bus bars for mechanically holding said groups together in a modular unit, said bus bars being molded into said cover means and each comprising an arm extending laterally of said bus bars to a different longitudinal edge of said plate assembly, each arm terminating at the longitudinal edge of said plate assembly to form an electrical connection, and means forming a part of said cover means for aiding in lifting said plate assembly.

2. The modular battery plate assembly set forth in claim 1 wherein the arm of each of said bus bars extends laterally thereof to and along a different longitudinal edge of said cover means to form a detachable electrical connection.

3. The modular battery plate assembly set forth in claim 1 wherein each of said arms is provided with a V-shape point at the longitudinal edge of said plate assembly for forming electrical connections.

4. The modular battery plate assembly set forth in claim 3 wherein each V-shape point extends downward from said cover means in the direction of said plates to form an electrical connection with a conductor running longitudinally of an edge of a battery case within which said plate assembly is mounted.

References Cited

UNITED STATES PATENTS

| 3,635,766 | 1/1972 | Quisling | 136—6 R X |
|---|---|---|---|
| 3,546,023 | 12/1966 | Halter et al. | 136—166 |
| 3,396,056 | 8/1968 | Gonnard | 136—6 C |
| 3,294,589 | 12/1966 | Barrett | 136—6 E X |
| 3,525,639 | 8/1970 | Redmon | 136—6 E |
| 3,576,679 | 4/1971 | Shipps | 136—6 F X |
| 3,402,077 | 9/1968 | Kida et al. | 136—6 GV |
| 3,516,869 | 6/1970 | Broglio | 136—114 |

WINSTON A. DOUGLAS, Primary Examiner

C. F. LEFEVOUR, Assistant Examiner

U.S. Cl. X.R.

136—7, 166.